United States Patent [19]

Wallevik et al.

[11] 4,237,111

[45] Dec. 2, 1980

[54] METHOD OF MANUFACTURING MELTED IRON OXIDE

[75] Inventors: Oddmund Wallevik, Porsgrunn; Erik Dessen, Skien, both of Norway

[73] Assignee: Norsk Hydro a.s., Oslo, Norway

[21] Appl. No.: 952,136

[22] Filed: Oct. 17, 1978

[30] Foreign Application Priority Data

Nov. 15, 1977 [NO] Norway ................................ 773905

[51] Int. Cl.[3] ............................................. C01G 49/02

[52] U.S. Cl. ......................................... 423/632; 75/11

[58] Field of Search ..................... 75/11, 95, 59, 93 E; 23/293 R; 432/13; 13/27, 35; 423/632, 633

[56] References Cited

FOREIGN PATENT DOCUMENTS 45-28093 9/1970 Japan .
823018 11/1959 United Kingdom ........................ 13/26
833879 5/1960 United Kingdom .

*Primary Examiner*—Hiram H. Bernstein

*Attorney, Agent, or Firm*—Wenderoth, Lind & Ponack

[57] ABSTRACT

The present invention relates to a method of manufacturing molten iron oxide in which magnesite is first rammed between the furnace wall and in a mold of sheet iron to form a lining. The lining is sintered by inserting cast iron or steel into the mold and melting the cast iron or steel at 1600°-1900° C. The major amount of the thus-melted iron steel material is poured out of the furnace and the remaining melt is converted to iron oxide by adding a charge of iron oxide to the furnace and the temperature of the mixture is adjusted such that a solid and melted material is formed within the furnace by regulating the electrical power supply, the mixture is stirred sufficiently to render the temperature of the mixture uniform throughout and then a major amount of the iron oxide melt thus-formed is charged and melted and stirred according to the same porcedure outlined above until the lining has to be changed. According to this procedure, the lining can be used for a long time without deterioration.

4 Claims, No Drawings

METHOD OF MANUFACTURING MELTED IRON OXIDE

The present invention relates to a method of manufacturing melted iron oxide, possibly containing minor amounts of other metal oxides. The melting is carried out in an induction furnace having a basic refractory lining, preferably of magnesite sintered at 1600°-1900° C.

By inductive melting in a crucible the necessary power for melting the charge is supplied through a layer along the wall of the crucible. The thickness of the layer depends on the electromagnetic properties of the charge and the working frequency of the furnace.

The movements of the charge in the crucible are also depending on the frequency and the diameter of the crucible.

Because of these characteristic feature of melting in an induction furnace, the refractory lining of the crucible is exposed to corrosive and erosive attacks. Generally speaking, the erosive attacks can be limited by choosing relatively high frequencies during the melting. However, this may lead to unfavourable temperature distribution in the crucible, especially in melts with high viscosity because the thickness of the power-absorbing layer decreases, which may increase the corrosive attack. The choice of frequency is also dependent on the requirement of a high specific energy absorption in the charge. Normally this will favour lower frequencies with increasing size of the furnace.

For the melting processes which are commonly carried out in induction furnaces, it is possible by proper selection of refractory lining to obtain a crucible which is essentially inert, chemically speaking, against the melted metal.

Most of the wear on the lining is caused by the non-electric conducting dross phase which has a lower melting point and is cooler than the metal phase.

A crucible furnace with a new lining is usually started by pre-sintering the lining using a metal mould which is inductively heated up to its melting point, whereupon scrap metal is charged. The electrical power to the furnace is then increased and the melting starts when the mould is melted down together with the first charge.

Normally, crucible furnaces are charged with rather coarse material, but such furnaces can also be used for re-melting metal chips etc. as the strong circulation of the melt and the considerable overtemperatures are utilized to drag the material quickly down into the melt.

The characteristic features, described above, for operating crucible furnaces when melting metals, can not be transferred directly to the art of melting iron oxide in induction furnaces.

Melting of iron oxide in induction furnaces has been tried in connection with the manufacture of iron oxide-based catalysts for the ammonia synthesis. British Pat. No. 833,878 describes manufacture of iron oxide catalyst in induction furnace. The furnaces was lined with magnesite which was sintered before the catalyst material was charged. The magnesite material was rammed between the furnace wall and the mould of pure sheet iron, whereupon the mould was bonded to the lining by heating to red heat i.e. 800°-900° C. The furnace was filled with catalyst material which was melted whereby the mould also melted and went into the catalyst melt together with some MgO which was extracted from the lining. Most of the melt was poured and the furnace was recharged with catalyst material which was melted down. The amount of MgO extracted from the lining decreased with every new charge if it contained only 0.05% MgO. The patent stated that 15-20 melting operations can be carried out before the lining must be renewed.

Manufacture of iron oxide based catalyst by melting in induction furnaces is also described by A. V. Slack and G. R. James in "Ammonia" Part III, page 145-146 Marcel Decker Inc. New York, 1977. Though induction furnaces are recommended in order to obtain high quality catalysts, it is emphasized that such furnaces have some disadvantages too. Besides high investment costs and low current efficiency, it is emphasized that the attacks on the linings constitutes a problem, even when MgO is used as lining material. It is further stated that start up of a cold furnace is problematic and in order to reduce this, it is recommended to charge melted catalyst during start-up of the furnace.

The object of the present invention is to arrive at a method of manufacturing melted iron oxide in an induction furnace and also to be able to produce a large number of product charges before the lining had to be renewed. This object can also be defined as increasing the life time of the lining of an induction furnace.

The life time of the lining depends on several factors in addition to its chemical composition. Magnesite has been found to be the most suitable material in spite of its limitations experienced by others.

In order to obtain a long lasting lining, it is essential that it has been optimally sintered. The temperature of the lining is also a determining factor. The lining should not be exposed to unnecessarily high temperatures which will increase the corrosive attack. Attempts were made to reduce the wear on the lining by keeping the temperature during the melting above the temperature at which a substantial part of the charge becomes liquid, but below the temperature at which the solubility of the lining in the melt increases. The lining should not be exposed to temperature shocks or uneven temperature distribution because this may cause strains and subsequent cracking.

By the method according to the present invention the above stated conditions have been taken into account in order to lengthen the life time of the lining. This has been done by proper choice of type of lining, method of sintering and the melting operation.

The special features of the method according to the invention are stated in the claims.

By the method according to the above referred British patent, the sintering was actually performed in two steps. The lining was first heated to 800°-900° C. whereupon iron oxide was charged and melted down, this implies that the final sintering was carried out during the first melting process. This method of sintering may cause severe attacks on the lining, first of all because unmelted iron oxide absorbs the necessary electrical power for melting at relatively high frequencies, which again means that the melted material absorbs all the power in a thin layer along the crucible wall. This leads to overheating along the crucible wall as the circulation of the melt is rather poor. The other cause for the severe corrosive attack results from the sintering method used which requires overtemperatures above ordinary working temperature necessary to obtain excellent sintering. In order to avoid the problems associated with this sintering method, the sintering can be performed by applying an inert material which is emptied out of the furnace before iron oxide is charged. However, even this method was found laborious and unfavourable, especially because the lining would be exposed to a temperature shock. The inventors therefore tried to apply a sintering material which could be converted to iron oxide, and by using such a method the above stated problems were avoided.

By the method chosen by the inventors, magnesite was rammed in known manner between the furnace wall and a mould of sheet iron. The lining was sintered by means of a melt of cast iron or steel at 1600°-1900° C. In order to avoid temperature shocks, when changing to iron oxide melting and to solve the start-up problems, only 60-80% of the iron melt was poured, whereupon the furnace immediately was charged with iron oxide with a high oxide content. The remaining iron from the sintering process was oxidized by said iron oxide and became an integrated part of the first charge of melted iron oxide.

As previously mentioned, it would be an advantage to keep the temperature as low as possible during the melting process. Further, uneven temperature distribution in the melt should be avoided because that will expose the lining to uneven corrosion. Low melting temperature will of course increase the viscosity of the melt and therefore very good stirring is essential. The inventors found that this could be obtained by gas stirring. Indirect gas stirring proved to be especially advantageous. Such stirring can for instance be obtained by lowering carbon rods into the melt. The rods will react with the oxides in the melt and release a mixture of CO and $CO_2$ which will cause vigorous circulation.

The particle form of the raw materials proved to constitute another problem in melting at low temperatures. Particles larger than 1-2 mm were unsuitable and would require strong circulation in the melt to ensure the fine grained material be drawn down into it. This problem could however be solved by stirring the fine grained material into the melt by means of said carbon rods.

The method according to the invention will be further illustrated in the examples which describe manufacture of iron oxide as well as iron oxide to which are added other metal oxides, promoters, in order to make catalysts based on iron oxide.

EXAMPLE 1

This example describes start up of a furnace and the production of the first charge of melted iron oxide. A crucible induction furnace of the medium-frequency type was used. The furnace was lined with magnesite with a high content of MgO. The magnesite material was rammed between the coil and a mould of sheet iron.

The current was switched on and the furnace was heated in the course of several hours to about 1300° C. The furnace was then filled with iron or steel blocks which while the power supply was increased, were melted and kept at 1700° C. for 20 min. before the melt was poured to a level just above the coil. Then the furnace was slowly heated to 1800°-1900° C. and kept at this temperature for 30 min. before 60-80% of the melt was poured. In order to convert the remaining iron to an iron oxide mixture of desired composition, hematite was added in batches. The supply of power and raw materials was adjusted so that a viscous mixture of solid and melted material was obtained. In order to obtain an even temperature distribution in the mixture, both vertically and horizontally, the mixture was stirred by means of indirect gas stirring between each batch of raw material added. This was performed intermittently by lowering carbon rods into the mixture. The best results were obtained when the rods were conducted intermittently down along the brim of the furnace and against its bottom. The furnace was filled to a level corresponding to the upper edge of the coil by repeated charging of raw material and stirring. The supply of raw material was stopped and the melt was homogenized by stirring. The temperature in the melt did not exceed 1600° C. 70-80% of the melt was poured and the furnace was ready for being charged with hematite or some other type of iron oxide having a lower oxygen content, whereupon the remaining melt could be converted to a melt of desired composition.

EXAMPLE 2

This example describes production of melted catalyst after having converted the iron remaining after the sintering process to iron oxide of desired composition. By charging a mixture of magnetite and hematite or iron together with minor amounts of metal oxides, promoters, the composition of the charged material corresponded to the composition of the melted catalyst poured. The melting of iron oxide and promoters was carried out as in example 1. Also the homogenization of the temperature by indirect gas stirring was done as described above. The production of melted catalyst was also made without exposing the lining to temperatures above 1600° C.

By use of the sintering and a start-up procedure which the invention implies, a most resistant lining was obtained. It was not exposed to temperature shocks and did not crack during the change-over from sintering to production of molten iron oxide.

It has proved to be possible by the present method, to melt iron oxide without exposing the lining to temperatures above 1600° C. during the melting. The lining is given an even temperature distribution. This is achieved by the special way of stirring the melt which homogenizates it at a lower temperature than would otherwise be possible.

Manufacture according to the invention of melted iron oxide has rendered it possible to use crucible induction furnace for at least 90 charges of melted iron oxide, of 1 ton each, before the lining had to be changed. Changing the lining and the subsequent start-up are expensive and laborious processes. Being able to increase the number of charges from 15-20 (British Pat. No. 833,878) to 70-90 will accordingly result in substantial savings in the production of melted iron oxide or iron oxide based catalysts. The method according to the invention is well suited for said processes.

I claim:

1. A method of manufacturing molten iron oxide which may contain minor amounts of other oxides which comprises inserting a mold of sheet iron in a crucible induction furnace, ramming magnetite between the mold and furnace wall, sintering the magnetite at a temperature of 1600°-1900° C. to form a furnace lining by inserting iron or steel material into the mold within the furnace and heating within said temperature range to melt the iron or steel material, pouring out the major amount of the thus-melted iron or steel material, converting the remaining melt within the furnace to iron oxide by adding a charge of iron oxide to the furnace, adjusting the temperature of the mixture such that a mixture of solid and melted material is formed within the furnace by regulating the electrical power supply, stirring said mixture sufficiently to render the temperature of the mixture uniform throughout and then pouring a major amount of the iron oxide melt thus-formed and thereafter charging the furnace with more iron oxide material and repeating the above procedure of producing the molten iron oxide until the lining has to be changed.

2. A method according to claim 1, characterized in that the stirring is performed by gas stirring.

3. A method according to claim 1, characterized in that the stirring is performed by indirect gas stirring by lowering carbon rods, intermittently or continuously, down into the mixture of oxides whereby the temperature in the melt is kept below the liquidus temperature of the oxide mixture during the melting process.

4. A method according to claim 1 wherein 60–80% of the iron or steel melt used during the sintering process is poured out before charging the remaining melt with iron oxide to convert the melt to iron oxide.

* * * * *

UNITED STATES PATENT AND TRADEMARK OFFICE

CERTIFICATE OF CORRECTION

PATENT NO. : 4,237,111

DATED : December 2, 1980

INVENTOR(S) : Oddmund WALLEVIK; Erik DESSEN

It is certified that error appears in the above-identified patent and that said Letters Patent are hereby corrected as shown below:

Column 4, line 59, change "magnetite" to -- magnesite --;

Column 4, line 60, change "magnetite" to -- magnesite --.

Signed and Sealed this

*Twenty-ninth* Day of *September 1981*

[SEAL]

*Attest:*

GERALD J. MOSSINGHOFF

*Attesting Officer* *Commissioner of Patents and Trademarks*